(No Model.)
H. LAND.
DRILL.
No. 494,869. Patented Apr. 4, 1893.
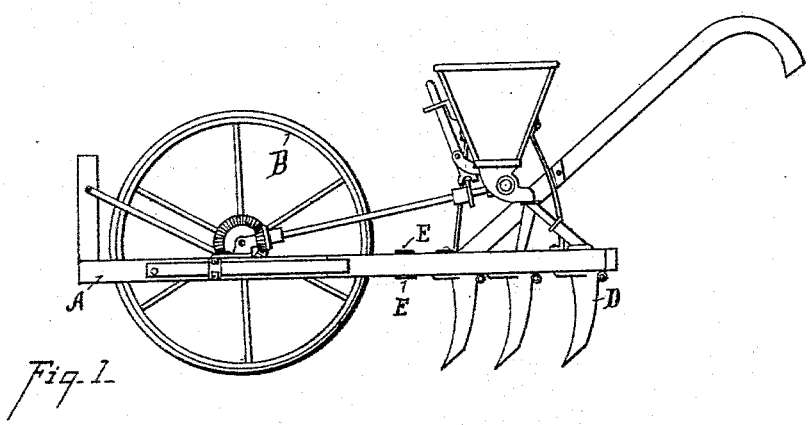
Fig. 1.
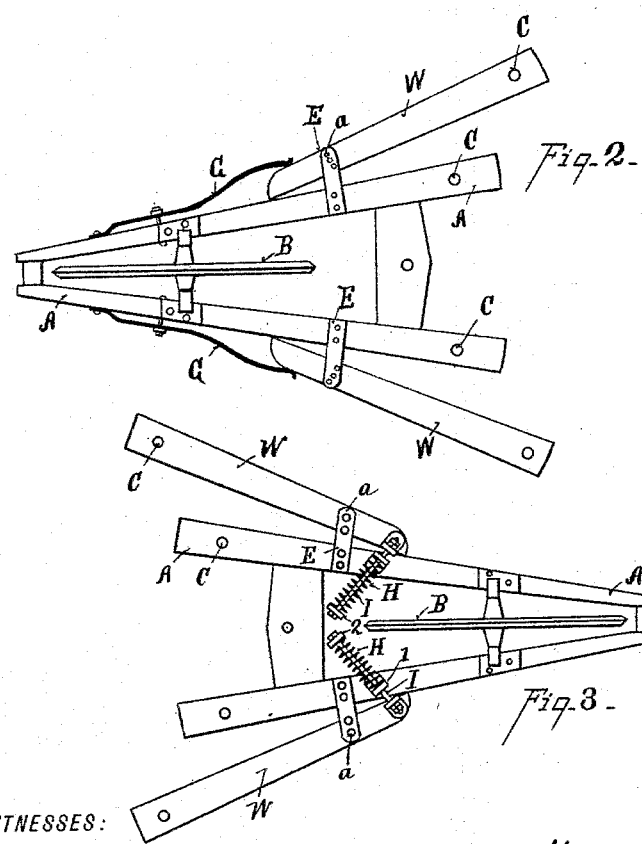
Fig. 2.
Fig. 3.
WITNESSES:
C. W. Miles
T. Simmons
INVENTOR
Harry Land
By Wood & Boyd
ATTORNEY.

UNITED STATES PATENT OFFICE.

HARRY LAND, OF RICHMOND, INDIANA, ASSIGNOR TO THE WAYNE WORKS, OF SAME PLACE.

DRILL.

SPECIFICATION forming part of Letters Patent No. 494,869, dated April 4, 1893.

Application filed December 20, 1892. Serial No. 455,786. (No model.)

*To all whom it may concern:*

Be it known that I, HARRY LAND, a citizen of the United States, residing at Richmond, in the county of Wayne and State of Indiana, have invented certain new and useful Improvements in Drills, of which the following is a specification.

The object of my invention is to provide a drill with folding outside wings carrying the outside teeth, the movement being controlled by springs with the guides supporting the wings applied at the pivotal point, and the outward and inward movement of said wings being cushioned by the action of the springs avoiding the use of stops and frictional guides outside of the pivot point by reason of which a more flexible and easier movement of said wings is obtained.

The various features of my invention are more fully set forth in the description of the accompanying drawings making a part of this specification, in which—

Figure 1 is a side elevation of my improvement. Fig. 2 is a top plan view with the handles and seed dropping device removed. Fig. 3 is a modification of Fig. 2.

A represents the central V-shaped frame. B represents the ground wheel. C represents holes through which the seed is conveyed from the holder to the drill teeth D. These parts are of the usual construction.

E E represent yokes composed of two parallel plates secured to the V-shaped frame; the outer ends of these yokes which may be U-shaped brackets, are provided with a series of holes *a* through either of which the wings W are pivoted by removable bolts whereby the width of the drill may be adjusted. Each of these yokes serve as a support and guide to the wings, consequently the wings are free to move upon their pivotal center except as they are restrained by the springs.

G represents leaf springs attached on each side to the V-shape frame, and extending backward, their free ends bearing on the outside of the front ends of the wings.

In the modification shown in Fig. 2 coil springs H are shown as attached to rods I with seats 1 and 2 for compressing said springs as the wings move inward, seats 1 being secured to the frame so as to form a guide for the rod, and the tension of the spring being regulated by nuts on the inner ends of the rods I.

With either form of applying the springs herein shown the wings are free to move in and out under the tension of the springs, thereby cushioning them. It is very desirable to have these wings move readily and easily without undue friction, and to have them move in sufficiently to clear any obstruction they may come in contact with when drilling seed between corn rows, and after passing the hill or other obstruction to promptly and automatically return to the normal position. If the springs are not flexible and the wings do not move readily, they will tear up the corn hills before yielding. By supporting these wings on the bracket at the pivotal point, and having the springs bear upon the front end of the wings the long leverage of the wings causes them to yield readily inward, and move outward again without undue shock.

Having described my invention, what I claim is—

1. In combination with the V-shaped frame A, the wings W pivotally supported in the yokes E, with the yielding spring applied to the front end of the wings to hold them in their outward position, substantially as specified.

2. In combination with the V-shaped frame A, the wings W pivotally supported in the yokes E, with the coil springs H supported on the frame A and attached to the front ends of the wings to hold them in their outward position, substantially as specified.

In testimony whereof I have hereunto set my hand.

HARRY LAND.

Witnesses:
EDWARD BOYD,
T. SIMMONS.